United States Patent
Maksimovic et al.

(10) Patent No.: US 7,024,568 B2
(45) Date of Patent: Apr. 4, 2006

(54) METHOD AND SYSTEM FOR PROVIDING SELF-CALIBRATION FOR ADAPTIVELY ADJUSTING A POWER SUPPLY VOLTAGE IN A DIGITAL PROCESSING SYSTEM

(75) Inventors: Dragan Maksimovic, Boulder, CO (US); Sandeep Dhar, Boulder, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 544 days.

(21) Appl. No.: 10/236,482

(22) Filed: Sep. 6, 2002

(65) Prior Publication Data
US 2004/0049703 A1   Mar. 11, 2004

(51) Int. Cl.
*G06F 1/26*  (2006.01)
*H03H 11/26* (2006.01)
(52) U.S. Cl. ............. 713/300; 327/271; 327/277
(58) Field of Classification Search ........... 713/300; 327/271, 277, 284
See application file for complete search history.

(56) References Cited

U.S. PATENT DOCUMENTS

| | | | | |
|---|---|---|---|---|
| 4,494,021 A | | 1/1985 | Bell et al. | |
| 5,487,095 A | * | 1/1996 | Jordan et al. | 375/371 |
| 5,914,631 A | * | 6/1999 | Soneda | 327/535 |
| 5,963,074 A | * | 10/1999 | Arkin | 327/276 |
| 5,969,552 A | * | 10/1999 | Lee et al. | 327/158 |
| 6,157,247 A | * | 12/2000 | Abdesselem et al. | 327/540 |
| 6,208,183 B1 | | 3/2001 | Li et al. | |
| 6,390,579 B1 | | 5/2002 | Roylance et al. | |
| 6,415,388 B1 | * | 7/2002 | Browning et al. | 713/322 |
| 6,424,184 B1 | * | 7/2002 | Yamamoto et al. | 327/102 |
| 6,439,679 B1 | | 8/2002 | Roylance | |

FOREIGN PATENT DOCUMENTS

EP   1 223 493 A1   7/2002

* cited by examiner

*Primary Examiner*—Thomas Lee
*Assistant Examiner*—Ji H. Bae (57) ABSTRACT

A method for providing self-calibration for adaptively adjusting a power supply voltage in a digital processing system is provided that includes providing a nominal power supply voltage to the system as a power supply voltage. A regulator clock signal is propagated through a delay line. The delay line comprises a plurality of delay cells and is operable to function based on the nominal power supply voltage. A plurality of pairs of delay cells are sampled until a first and second delay cell are identified based on the first delay cell receiving the regulator clock signal and the second delay cell failing to receive the regulator clock signal at a specified time. A reference voltage is provided to the system as the power supply voltage. The system is operated using the first and second delay cells to determine whether to adjust the power supply voltage for the system.

20 Claims, 4 Drawing Sheets

METHOD AND SYSTEM FOR PROVIDING SELF-CALIBRATION FOR ADAPTIVELY ADJUSTING A POWER SUPPLY VOLTAGE IN A DIGITAL PROCESSING SYSTEM

TECHNICAL FIELD OF THE INVENTION

The present invention relates generally to power regulation for integrated circuits and, more particularly, to a method and system for providing self-calibration for adaptively adjusting a power supply voltage in a digital processing system.

BACKGROUND OF THE INVENTION

Business and consumers use a wide array of wireless devices, including cell phones, wireless local area network (LAN) cards, global positioning system (GPS) devices, electronic organizers equipped with wireless modems, and the like. The increased demand for wireless communication, and other mobile, devices has created a corresponding demand for technical improvements to such devices. Generally speaking, more and more of the components of conventional radio receivers and transmitters are being fabricated in a single integrated circuit package.

One important aspect of wireless communication devices having integrated circuits is battery life. In order to maximize battery life for these wireless communication devices, much emphasis has been placed on minimizing power consumption in the integrated circuits of the wireless communication devices.

Conventional approaches to minimizing power consumption in integrated circuits include voltage scaling. Voltage scaling is useful for minimizing dynamic power consumption due to switching. However, voltage scaling does not provide much, if any, benefit for static power consumption due to leakage current. This causes problems in digital technologies that have been scaled to be smaller and smaller, resulting in more leaky circuits. In fact, the leakage current, which used to be a relatively small component of total power consumption, is actually dominating total power consumption for many deep submicron digital chips. A digital chip with several million transistors, for example, may have a DC leakage current of several milliamps, or even tens of milliamps, when the chip is in a standby mode. In typical mobile devices, this amount of leakage current, and its corresponding power consumption, is unacceptable.

Conventional approaches to minimizing power consumption in integrated circuits also include threshold scaling. Threshold scaling is useful for minimizing static power consumption due to leakage current. However, threshold scaling does not provide much, if any, benefit for dynamic power consumption due to switching.

Thus, in order to make use of both voltage scaling to minimize dynamic power consumption and threshold scaling to minimize static power consumption, one approach has been to incorporate switching software into the chip. This switching software determines the voltage and threshold needed to operate a particular task and switches the chip into a corresponding mode while that task is being performed. One drawback to this approach includes the use of a safety margin in the calculation of critical path delays when selecting the mode, which results in the chip possibly not operating at its optimum potential.

A recent solution to this problem involves using adaptive voltage scaling and adaptive threshold scaling cooperatively based on a clock frequency for the chip as measured on the chip. This allows adaptive voltage scaling to be used to minimize dynamic power consumption at higher frequencies and adaptive threshold scaling to be used to minimize static power consumption at lower frequencies, without the use of an arbitrary safety margin for critical path delays. This solution involves the use of a delay line that mirrors a critical path for the application. However, using this approach, the critical path delay has to be matched to the length of the delay line at design time. In addition, the desired length of the delay line may vary based on a range of supply voltages and clock frequencies.

SUMMARY OF THE INVENTION

In accordance with the present invention, a method and system for providing self-calibration for adaptively adjusting a power supply voltage in a digital processing system are provided that substantially eliminate or reduce disadvantages and problems associated with conventional systems and methods. In particular, the length of a delay line that is used to determine the optimum power supply voltage is variable and may be selected at run time.

According to one embodiment of the present invention, a method for providing self-calibration for adaptively adjusting a power supply voltage in a digital processing system is provided. The method includes providing a nominal power supply voltage to the system as a power supply voltage. A regulator clock signal is propagated through a delay line. The delay line comprises a plurality of delay cells and is operable to function based on the nominal power supply voltage. A plurality of pairs of delay cells are sampled until a first and second delay cell are identified based on the first delay cell receiving the regulator clock signal and the second delay cell failing to receive the regulator clock signal at a specified time. A reference voltage is provided to the system as the power supply voltage. The system is operated using the first and second delay cells to determine whether to adjust the power supply voltage for the system.

According to another embodiment of the present invention, a method for providing self-calibration for adaptively adjusting a power supply voltage in a digital processing system is provided. The method includes setting a tap signal to a highest value. A regulator clock signal is propagated through a delay line. The delay line comprises a plurality of delay cells. A first pair of taps in the delay line is sampled. Each tap corresponds to one of the delay cells. A determination is made regarding whether the first pair of taps corresponds to a first and second delay cell. The first and second delay cells are identified based on the first delay cell receiving the regulator clock signal and the second delay cell failing to receive the regulator clock signal at a specified time. The calibration is concluded when a determination is made that the first pair of taps corresponds to the first and second delay cells. The system is operated using the first and second delay cells to determine whether to adjust a power supply voltage for the system.

According to yet another embodiment of the present invention, a system for providing self-calibration for adaptively adjusting a power supply voltage in a digital processing system is provided that includes a power supply, a slack time detector, a multiplexer, and a calibrator. The power supply is operable to generate a power supply voltage for the system. The slack time detector is coupled to the power supply and is operable to generate a plurality of detector outputs. The multiplexer is coupled to the power supply and the slack time detector. The multiplexer is operable to receive the detector outputs and to generate a power control signal based on the detector outputs. The calibrator is coupled to the power supply and the multiplexer. The calibrator is operable to identify a subset of the detector outputs to be selected by the multiplexer as the power control signal. The power supply is operable to generate the power supply voltage based on the power control signal.

Technical advantage of one or more embodiments of the present invention include providing an improved method for adaptively adjusting a power supply voltage in a digital processing system. In a particular embodiment, the length of a delay line that is used to determine the optimum power supply voltage is variable. As a result, the appropriate length may be selected at run time based on the actual operating conditions of the application. Accordingly, the system may be designed without detailed knowledge of the critical path in the application, and the application can be operated with minimized power consumption at a nominal clock frequency and power supply voltage.

Other technical advantages will be readily apparent to one skilled in the art from the following figures, description, and claims.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged digital processing system.

Figure 1:
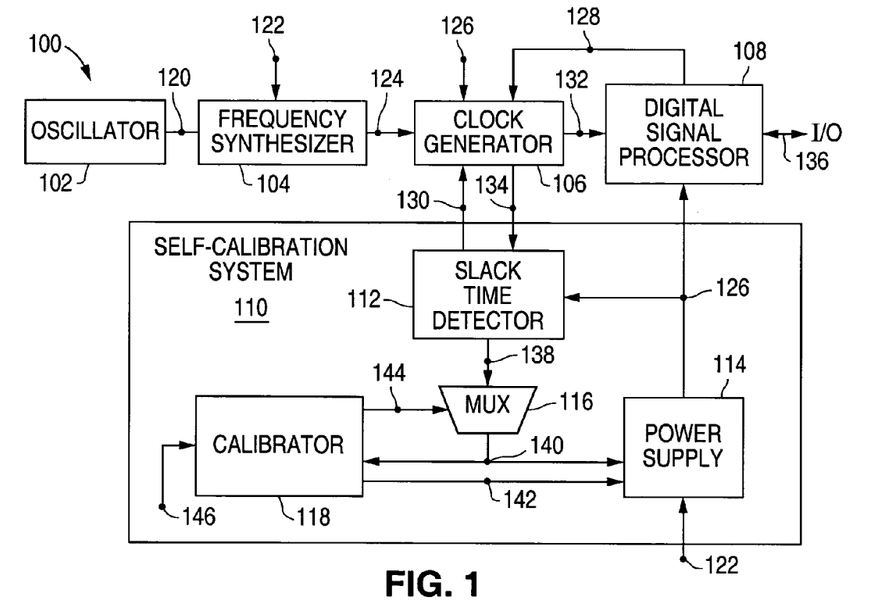
FIG. 1 is a block diagram illustrating a digital processing system that is operable to provide self-calibration for adaptively adjusting a power supply voltage for the digital processing system in accordance with one embodiment of the present invention.

FIG. 1 is a block diagram illustrating a digital processing system 100 that is operable to provide self-calibration for adaptively adjusting a power supply voltage for the digital processing system 100 in accordance with one embodiment of the present invention. The digital processing system 100 comprises an oscillator 102, a frequency synthesizer 104, a clock generator 106, a digital signal processor 108, and a self-calibration system 110. The self-calibration system 110 comprises a slack time detector 112, a power supply 114, a multiplexer 116 and a calibrator 118.

The oscillator 102 is operable to generate a reference frequency signal 120. The oscillator 102 may comprise a crystal oscillator or other suitable type of oscillator. For the embodiment in which the oscillator 102 comprises a crystal oscillator, the reference frequency signal 120 may be determined by the mechanical properties of a piezoelectric crystal for the oscillator 102.

The frequency synthesizer 104 is coupled to the oscillator 102. The frequency synthesizer 104 may comprise a phase-locked loop frequency synthesizer or any other suitable type of frequency synthesizer. The frequency synthesizer 104 is operable to receive the reference frequency signal 120 from the oscillator 102 and an input voltage 122 and to generate an external clock signal 124 based on those inputs 120 and 122. The external clock signal 124 comprises an operating frequency that is a multiple of the reference frequency signal 120 provided by the oscillator 102. According to one embodiment, the external clock signal 124 may represent a set of clock frequencies.

The clock generator 106 is coupled to the frequency synthesizer 104, the digital signal processor 108, and the slack time detector 112. The clock generator 106 is operable to receive the external clock signal 124 from the frequency synthesizer 104, a power supply voltage 126, a frequency control signal 128 from the digital signal processor 108, and a steady signal 130 from the slack time detector 112. The clock generator 106 may receive the power supply voltage 126 from the power supply 114. The clock generator 106 is also operable to generate a clock signal 132 and a regulator clock signal 134 based on those inputs 124, 126, 128 and 130.

The frequency control signal 128 is operable to set a desired operating clock frequency, $f_{clk}$, for the clock generator 106, which may be a specified fraction of the external clock signal 124. For example, if the external clock signal 124 is 1.6 GHz, the clock generator 106 may divide the external clock signal 124 by four, based on the frequency control signal 128, in order to produce a 400 MHz clock as the clock signal 132 supplied to the digital signal processor 108.

As described in more detail below, the steady signal 130 is operable to indicate to the clock generator 106 that the power supply voltage 126 has been adjusted to a sufficient level to match the desired clock speed of the clock signal 132. When the steady signal 130 is provided, the clock signal 132 is applied to the digital signal processor 108.

In operation, if the desired operating frequency is lower than the current operating frequency, the frequencies of both the clock signal 132 and the regulator clock signal 134 are changed at substantially the same time to the new value $f_{regclk}=a\,(f_{clk})$ where a is a constant. If the desired operating frequency is higher than the current operating frequency, the frequency of the regulator clock signal 134 is changed first. Then, when the power supply voltage 126 reaches the new steady-state value, the steady signal 130 is asserted, and the frequency of the clock signal 132 is updated to $f_{clk}=f_{regclk}/a$. If a=1, in steady state, the clock signal 132 and the regulator clock signal 134 have the same frequency and phase.

The digital signal processor 108 is coupled to the clock generator 106 and the power supply 114. The digital signal processor 108 is operable to receive the clock signal 132 from the clock generator 106 and the power supply voltage 126 from the power supply 114 and to generate the frequency control signal 128 based on those inputs 132 and 126. The digital signal processor 108 is also operable to communicate input/output (I/O) data 136 with one or more associated processing systems (not shown in FIG. 1), such as a mobile communication unit, a computing system, and the like.

The digital signal processor 108 may comprise any suitable digital processing component, such as a processor designed for performing mathematical computations, and may be programmable in that the digital signal processor 108 may be used for manipulating different types of information, such as sound, images, video, and the like. According to one embodiment, the digital signal processor 108 has varying operating frequencies.

The slack time detector 112 is coupled to the clock generator 106 and the power supply 114. The slack time detector 112 is operable to receive the regulator clock signal 134 from the clock generator 106 and the power supply voltage 126 from the power supply 114 and to generate the steady signal 130 and a plurality of detector outputs 138 based on those inputs 134 and 126.

As described in more detail below in connection with FIG. 2, the slack time detector 112 may comprise a critical path, slack time discriminator. According to this embodiment, the slack time detector 112 comprises N delay cells and power supply adjustment circuitry and is operable to control the power supply 114 to adjust the power supply voltage 126. The N delay cells are coupled in series, each of which has a delay (D) determined by a value of the power supply voltage 126 such that a clock edge applied to an input of a first delay cell ripples sequentially through the N delay cells. The power supply adjustment circuitry, which is associated with the N delay cells, is capable of adjusting the power supply voltage 126 and is operable to (i) monitor the outputs of at least a K delay cell and a K+1 delay cell, (ii) determine whether the clock edge has reached the output of the K delay cell and the output of the K+1 delay cell, and (iii) generate a control signal capable of adjusting the power supply voltage 126.

The power supply 114 is coupled to the digital signal processor 108, the slack time detector 112, the multiplexer 116 and the calibrator 118. The power supply 114 is operable to receive a power control signal 140 from the multiplexer 116, a nominal voltage signal 142 from the calibrator 118, and the input voltage 122 and to generate the power supply voltage 126 based on those inputs 140, 142 and 122. For example, the power control signal 140 may comprise one or more signals operable to indicate whether the power supply 114 is to increase the power supply voltage 126, decrease the power supply voltage 126 or make no change to the power supply voltage 126. The power supply 114 may comprise a battery or other suitable device capable of providing a varying power supply voltage 126 to the digital signal processor 108 and the slack time detector 112.

The multiplexer 116 is coupled to the slack time detector 112 and the calibrator 118. The multiplexer 116 is operable to receive the detector outputs 138 from the slack time detector 112 and a tap signal 144 from the calibrator 118 and to generate the power control signal 140 based on those inputs 138 and 144. For example, based on the tap signal 144, the multiplexer 116 may provide a corresponding subset of the detector outputs 138 to the power supply 114 and the calibrator 118 as the power control signal 140. As described in more detail below in connection with FIG. 4, the multiplexer 116 may comprise two or more multiplexers.

The calibrator 118 is coupled to the power supply 114 and the multiplexer 116. The calibrator 118 is operable to receive the power control signal 140 from the multiplexer 116 and a reset signal 146 and to generate the nominal voltage signal 142 and the tap signal 144 based on those inputs 140 and 146. The nominal voltage signal 142 is operable to provide a nominal power supply voltage to the power supply 114 for use as the power supply voltage 126 for the system 100 during calibration. As described in more detail below in connection with FIG. 4, the calibrator 118 is operable to determine the appropriate detector outputs 138 to be selected by the multiplexer 116 as the power control signal 140 based on a self-calibration process for the digital processing system 100. Based on this determination, the calibrator 118 is operable to provide the appropriate tap signal 144 to the multiplexer 116.

Figure 2:
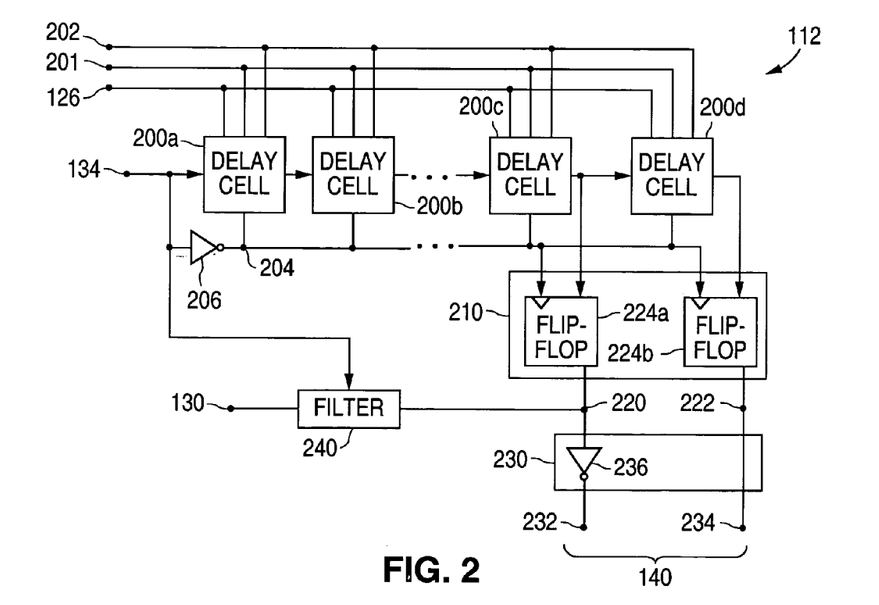
FIG. 2 is a block diagram illustrating the slack time detector of FIG. 1 in accordance with one embodiment of the present invention.

FIG. 2 is a block diagram illustrating the slack time detector 112 in accordance with one embodiment of the present invention. The illustrated slack time detector 112 comprises a delay line; however, it will be understood that the slack time detector 112 may comprise any suitable circuit operable to measure the response of logic gates in the digital signal processor 108 relative to the regulator clock signal 134 without departing from the scope of the present invention.

The slack time detector 112 comprises a timing comparison circuit. According to the illustrated embodiment, the timing comparison circuit comprises a plurality of delay cells 200 that are operable to allow a measurement of timing requirements for the digital signal processor 108. Each of the delay cells 200 is operable to receive the power supply voltage 126. Each delay cell 200 may also be operable to receive optional back bias voltages 201 and 202. As used herein, "each" means every one of at least a subset of the identified items.

For the embodiment in which the back bias voltages 201 and 202 are used, the system 100 is operable to adjust not only the power supply voltage 126 but also the back bias voltages 201 of PMOS transistors and the back bias voltages 202 of NMOS transistors in order to regulate the power use of the digital signal processor 108. In this embodiment, the back bias voltages 201 and 202 are applied to the gates of the transistors in order to change the threshold voltages of the PMOS and NMOS devices, respectively.

An initial delay cell 200a is operable to receive the regulator clock signal 134 from the clock generator 106. This regulator clock signal 134 is operable to be processed through each of the delay cells 200 until the processing is halted by the delay cells 200 being reset. The delay cells 200 are operable to be reset by a reset signal 204 that is generated by an inverter 206 coupled to the regulator clock signal 134.

The slack time detector 112 also comprises a register 210 that is operable to receive the output from a first delay cell 200c and the output from a second delay cell 200d. Although the second delay cell 200d may be directly coupled to the first delay cell 200c, it will be understood that any suitable number of delay cells 200 may be coupled between the first and second delay cells 200c and 200d without departing from the scope of the present invention. The first and second delay cells 200c and 200d may be identified in accordance with the description given below in connection with FIG. 4. The register 210 is also operable to generate a first status signal 220 based on the output from the first delay cell 200c and a second status signal 222 based on the output from the second delay cell 200d.

According to one embodiment, the register 210 comprises a pair of edge-triggered flip-flops 224, each of which is operable to receive the reset signal 204 as a clock input. Thus, according to this embodiment, the first flip-flop 224a is operable to receive the output from the first delay cell 200c and to generate the first status signal 220 based on that output, and the second flip-flop 224b is operable to receive the output from the second delay cell 200d and to generate the second status signal 22 based on that output.

The slack time detector 112 also comprises a decoder 230 that is operable to receive the first and second status signals 220 and 222 and to generate first and second power control signals 232 and 234 based on the status signals 220 and 222. The power control signal 140 may comprise these power control signals 232 and 234. According to one embodiment, the decoder 230 comprises an inverter 236 that is operable to invert the first status signal 220 in order to generate the first power control signal 232, while the second power control signal 234 is simply the same signal as the second status signal 222.

The slack time detector 112 may also comprise a digital filter 240 that is operable to receive the regulator clock signal 134 and the first status signal 220. The filter 240 is also operable to average a specified number of first status signals 220 in order to generate a steady signal 130 for the clock generator 106. According to one embodiment, the filter 240 is operable to average from two to eight first status signals 220 in order to generate one steady signal 130. However, it will be understood that the filter 240 may be operable to average any suitable number of first status signals 220 in order to generate one steady signal 130 without departing from the scope of the present invention.

In operation, according to one embodiment, the initial delay cell 200a of the slack time detector 112 receives a rising clock edge for the regulator clock signal 134 from the clock generator 106. This logic high input signal is provided to a subsequent delay cell 200b, and so on, until the reset signal 204 provides a logic high when the regulator clock signal 134 goes low.

Although the operation of the slack time detector 112 is described in terms of two trigger events, namely a rising edge of the regulator clock signal 134 and a subsequent falling edge of the regulator clock signal 134, that are used to monitor the slack time and control the level of the power supply voltage 126, it will be understood that this is by way of illustration only and should not be construed so as to limit the scope of the present invention. The slack time detector 112 may be easily reconfigured so that a falling edge of the regulator clock signal 134 and a subsequent rising edge of the regulator clock signal 134 may be used as trigger events to monitor the slack time and control the level of the power supply voltage 126.

The register 210 latches the output of the first delay cell 200c in the first flip-flop 224a and the output of the second delay cell 200d in the second flip-flop 224b. The output of the first flip-flop 224a, the first status signal 220, is provided to the filter 240 for averaging to generate the steady signal 130 for the clock generator 106.

In addition, the first status signal 220 is inverted in the decoder 220 to generate the first power control signal 232, and the second status signal 222, which is the output from the second flip-flop 224b of the register 210, is provided as the second power control signal 234.

When the logic high from the rising edge of the regulator clock signal 134 fails to reach the first delay cell 200c, the slack time detector 112 requests more power by generating a logic high for the first power control signal 232 and a logic low for the second power control signal 234.

When the logic high from the rising edge of the regulator clock signal 134 reaches the first delay cell 200c but not the second delay cell 200d, the digital signal processor 108 is running under optimum conditions for meeting timing requirements and minimizing power consumption. In this case, the slack time detector 112 requests no change in power by generating a logic low for the first power control signal 232 and a logic low for the second power control signal 234.

Finally, when the logic high from the rising edge of the regulator clock signal 134 reaches both the first and second delay cells 200c and 200d, the slack time detector 112 requests less power by generating a logic low for the first power control signal 232 and a logic high for the second power control signal 234.

Figure 3:
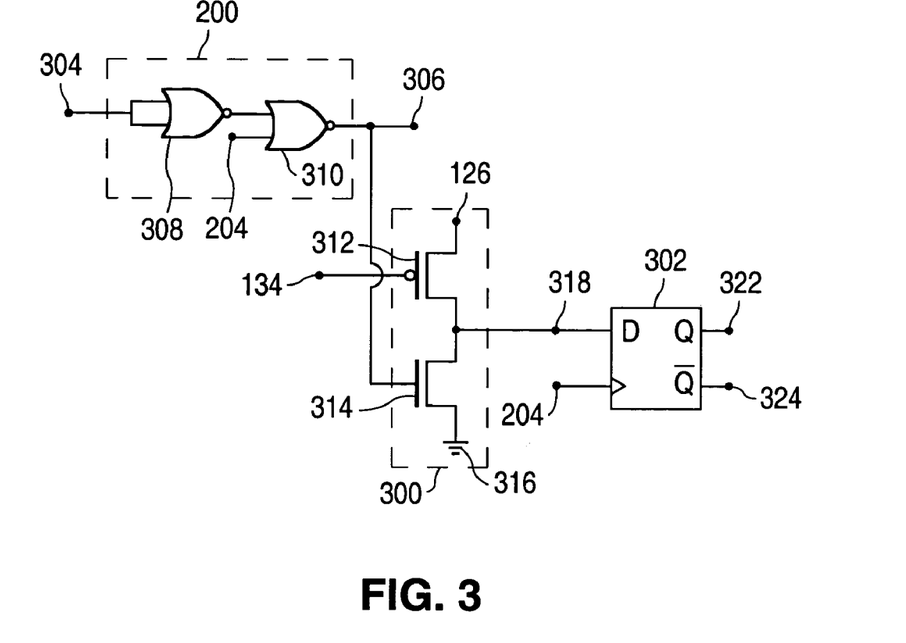
FIG. 3 is a circuit diagram illustrating details of a portion of the slack time detector of FIG. 2 in accordance with one embodiment of the present invention.

FIG. 3 is a circuit diagram illustrating details of a portion of the slack time detector 112 in accordance with one embodiment of the present invention. The portion illustrated comprises a delay cell 200, as well as a dynamic level shifter 300 and a flip-flop 302 (which are not shown in FIG. 2).

According to this embodiment, the delay cell 200 comprises an input terminal 304 that is operable to receive as an input signal the output signal from a previous delay cell 200 in the delay line or, in the case of the initial delay cell 200a, the regulator clock signal 134. The delay cell 200 also comprises on output terminal 306 that is operable to provide an output signal for the input terminal of a subsequent delay cell 200 based on the input signal received at the input terminal 304.

According to one embodiment, the delay cell 200 also comprises two NOR gates 308 and 310. The NOR gate 308 comprises two inputs that are each coupled to the input terminal 304 such that the output of the NOR gate 308 comprises a logic high when the signal at the input terminal 304 is a logic low and comprises a logic low when the signal at the input terminal 304 is a logic high.

The NOR gate 310 is coupled to the NOR gate 308 and to the output terminal 306. The NOR gate 310 comprises one input that is operable to receive the output from the NOR gate 308 and one input that is operable to receive the reset signal 204. Thus, the output of the NOR gate 310 that is provided at the output terminal 306 of the delay cell 200 comprises a logic high when the output of the NOR gate 308 comprises a logic low, as a result of the signal at the input terminal 304 comprising a logic high, and the reset signal 204 comprises a logic low. Otherwise, the output of the NOR gate 310 comprises a logic low.

The dynamic level shifter 300 is coupled to the output terminal 306 of the delay cell 200 and comprises a PMOS transistor 312 and an NMOS transistor 314. The PMOS transistor 312 comprises a source that is coupled to the power supply voltage 126, a gate that is coupled to the regulator clock signal 134, and a drain that is coupled to the flip-flop 302. The NMOS transistor 314 comprises a source that is coupled to ground 316, a gate that is coupled to the output terminal 306 of the delay cell 200, and a drain that is coupled to the flip-flop 302 and to the drain of the PMOS transistor 312. The dynamic level shifter 300 is operable to generate a shifter output 318 based on the signal at the output terminal 306 of the delay cell 200 and the regulator clock signal 134.

The flip-flop 302 comprises an edge-triggered flip-flop and is coupled to the drains of the transistors 312 and 314. The flip-flop 302 is operable to receive the shifter output 318 from the dynamic level shifter 300 and the reset signal 204 as a clock signal and to generate a Q output 322 by latching the shifter output 318, in addition to an inverted Q output 324. The inverted Q output 324 is operable to provide a tap-n signal 324 for use in the self-calibration system 110, as described in more detail below in connection with FIG. 4. The tap n signal 324 refers to the output of the n h delay cell 200. Thus, a tap-4 signal 324 corresponds to the output of the fourth delay cell 200 in the delay line.

In operation, according to one embodiment, the regulator clock signal 134 may initially provide a rising clock edge. Thus, the regulator clock signal 134 comprises a logic high, while the reset signal 204 comprises a logic low. In addition, the signal at the input terminal 304 of the delay cell 200 may comprise a logic low until the regulator clock signal 134 propagates through the previous delay cells 200. Thus, based on the signals 134 and 204 and the signal at the input terminal 304, the NOR gate 308 generates a logic high, and the NOR gate 310 generates a logic low at the output terminal 306.

The logic low at the output terminal 306 turns off the NMOS transistor 314, while the logic high of the regulator clock signal 134 turns off the PMOS transistor 312. In this situation, the shifter output 318 remains in its previous state of logic high, resulting in a tap-n signal 324 of logic low.

Once the regulator clock signal 134 propagates through to the input terminal 304, the NOR gate 308 generates a logic low, and the NOR gate 310 generates a logic high at the output terminal 306. The logic high at the output terminal 306 turns on the NMOS transistor 314, while the persisting logic high of the regulator clock signal 134 keeps the PMOS transistor 312 off. In this situation, the shifter output 318 becomes logic low, resulting in a tap-n signal 324 of logic high.

Finally, when the regulator clock signal 134 goes to a logic low and the reset signal 204 goes to a logic high, the NOR gate 310 generates a logic low at the output terminal 306 based on the reset signal 204. The logic low at the output terminal 306 turns off the NMOS transistor 314, and the logic low of the regulator clock signal 134 turns on the PMOS transistor 312. In this situation, the shifter output 318 becomes logic high, resulting in a tap-n signal 324 of logic low during the reset state.

Figure 4:
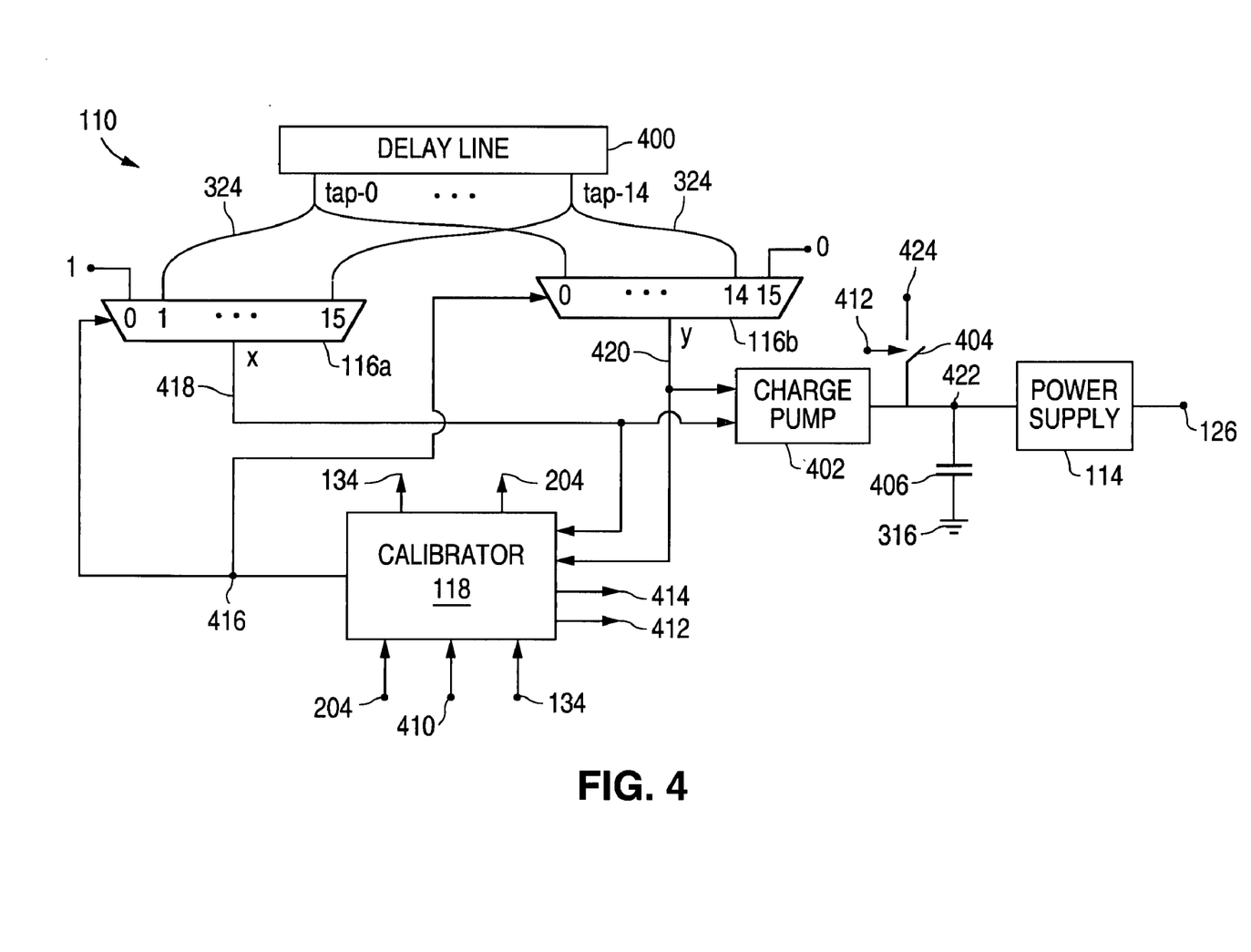
FIG. 4 is a block diagram illustrating the self-calibration system of FIG. 1 in accordance with one embodiment of the present invention.

FIG. 4 is a block diagram illustrating the self-calibration system 110 in accordance with one embodiment of the present invention. In addition to the power supply 114, the multiplexer 116 and the calibrator 118, the self-calibration system 110 comprises a delay line 400, a charge pump 402, a switch 404 and a capacitor 406.

As part of the slack time detector 112, the delay line 400 may comprise a plurality of delay cells 200, along with dynamic level shifters 300 and flip-flops 302, as described above in connection with FIG. 3. The delay line 400 is operable to provide each tap-n signal 324 to the multiplexer 116.

For the illustrated embodiment, the multiplexer 116 comprises a first multiplexer 116a and a second multiplexer 116b. The multiplexers 116a and 116b each comprise a 16:1 multiplexer. For this embodiment, the delay line 400 is operable to generate fifteen tap-n signals 324 for fifteen delay cells 200. However, it will be understood that the delay line 400 may comprise any number of delay cells 200 that is greater than or equal to fifteen for this embodiment. In addition, it will be understood that the delay line 400 may generate any suitable number of tap-n signals 324 with a corresponding change in the multiplexer 116 without departing from the scope of the present invention.

Returning to the illustrated embodiment, the least significant bit of the first multiplexer 116a is tied to a logic high and the remaining bits receive the tap-0 through tap-14 signals 324 from the delay line 400. For the second multiplexer 116b, the most significant bit is tied to a logic low and the remaining bits receive the tap-0 through tap-14 signals 324 from the delay line 400.

The calibrator 118 is operable to receive the regulator clock signal 134, the reset signal 204, and a start signal 410 and to provide the regulator clock signal 134 and the reset signal 204 to the delay line 400. The calibrator 118 is also operable to generate a prepare signal 412, a calibrating signal 414, and a tap signal 416. The calibration process may be started with the reset signal 204 or the start signal 410 received at the calibrator 118, and the calibrator 118 may assert the prepare signal 412 to prepare the system 100 for calibration and the calibrating signal 414 to indicate to the system 100 that the calibration process is in progress.

As described in more detail below in connection with FIG. 6, the calibrator 118 may provide the tap signal 416 to the first and second multiplexers 116a and 116b in order to identify which of the tap-n signals 324 are to be selected by the multiplexers 116a and 116b. The first multiplexer 116a is operable to select a tap-n signal 324 based on the tap signal 416 and to provide that signal 324 as a first multiplexer output, x, 418 to the calibrator 118 and to the charge pump 402. The second multiplexer 116b is also operable to select a tap-n signal 324 based on the tap signal 416 and to provide that signal 324 as a second multiplexer output, y, 420 to the calibrator 118 and to the charge pump 402.

The calibrator 118 is also operable to sample the multiplexer outputs (x, y) 418 and 420 in order to identify the first and second delay cells 200 in the delay line 400 that are to generate the tap-n signals 324 for the multiplexer 116. When the multiplexer outputs (x, y) 418 and 420 comprise (high, low), the corresponding delay cells 200 are identified as the first and second delay cells 200c and 200d for use by the slack time detector 112.

As described below in connection with FIG. 6, by providing the logic high as the least significant bit in the first multiplexer 116a and the logic low as the most significant bit in the second multiplexer 116b, the calibrator 118 will be able to identify one set of tap-n signals 324 corresponding to first and second delay cells 200c and 200d to be used by the slack time detector 112. For example, if the signal propagated too far along the delay line 400, the tap-14 signal 324 would be a logic high, resulting in a (high, low) from the first attempt to identify the delay cells 200c and 200d. Also, if the signal did not propagate far enough along the delay line 400, the tap-0 signal 324 would be a logic low, resulting in a (high, low) from the last attempt to identify the delay cells 200c and 200d.

The charge pump 402 is operable to receive the multiplexer outputs (x, y) 418 and 420 and to generate a reference voltage 422 for the power supply 114 based on those inputs 418 and 420. The power supply 114 is operable to generate the power supply voltage 126 based on the reference voltage 422.

The switch 404 is operable to be closed based on the prepare signal 412. When closed, the switch 404 is operable to couple a nominal power supply voltage 424 to the output of the charge pump 402 in order to provide the nominal power supply voltage 424 to the power supply 114 as the reference voltage 422. When opened, the switch 404 is operable to allow the charge pump 402 to provide the reference voltage 422. The capacitor 406 is operable to couple the output of the charge pump 402 to ground 316.

Figure 5:
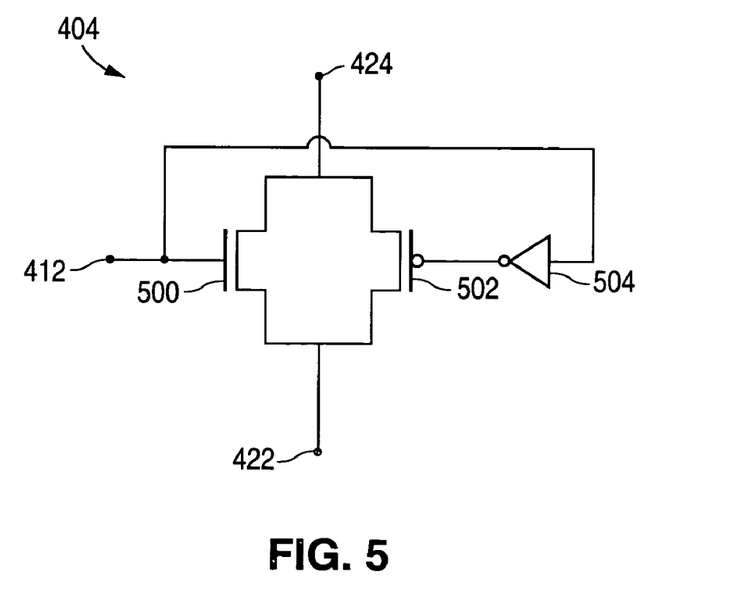
FIG. 5 is a block diagram illustrating the switch of FIG. 4 in accordance with one embodiment of the present invention.

FIG. 5 is a block diagram illustrating the switch 404 in accordance with one embodiment of the present invention. The switch 404 comprises an NMOS transistor 500, a PMOS transistor 502, and an inverter 504. The NMOS transistor 500 comprises a drain that is coupled to the nominal power supply voltage 424, a gate that is coupled to the prepare signal 412, and a source that is coupled to the reference voltage 422. The PMOS transistor 502 comprises a source that is coupled to the nominal power supply voltage 424, a gate that is coupled to the inverter 504, and a drain that is coupled to the reference voltage 422. The inverter 504 is coupled to the prepare signal 412 and to the gate of the PMOS transistor 502 such that the inverter 504 is operable to provide an inverted prepare signal 412 to the PMOS transistor 502.

Thus, when the prepare signal 412 is asserted, the NMOS transistor 500 is turned on and the PMOS transistor 502 is turned on, allowing the nominal power supply voltage 424 to be provided as the reference voltage 422. Alternatively, when the prepare signal 412 is de-asserted, the NMOS transistor 500 is turned off and the PMOS transistor 502 is turned off, preventing the nominal power supply voltage 424 from being provided as the reference voltage 422. In this case, the charge pump 402 provides the reference voltage 422.

Figure 6:
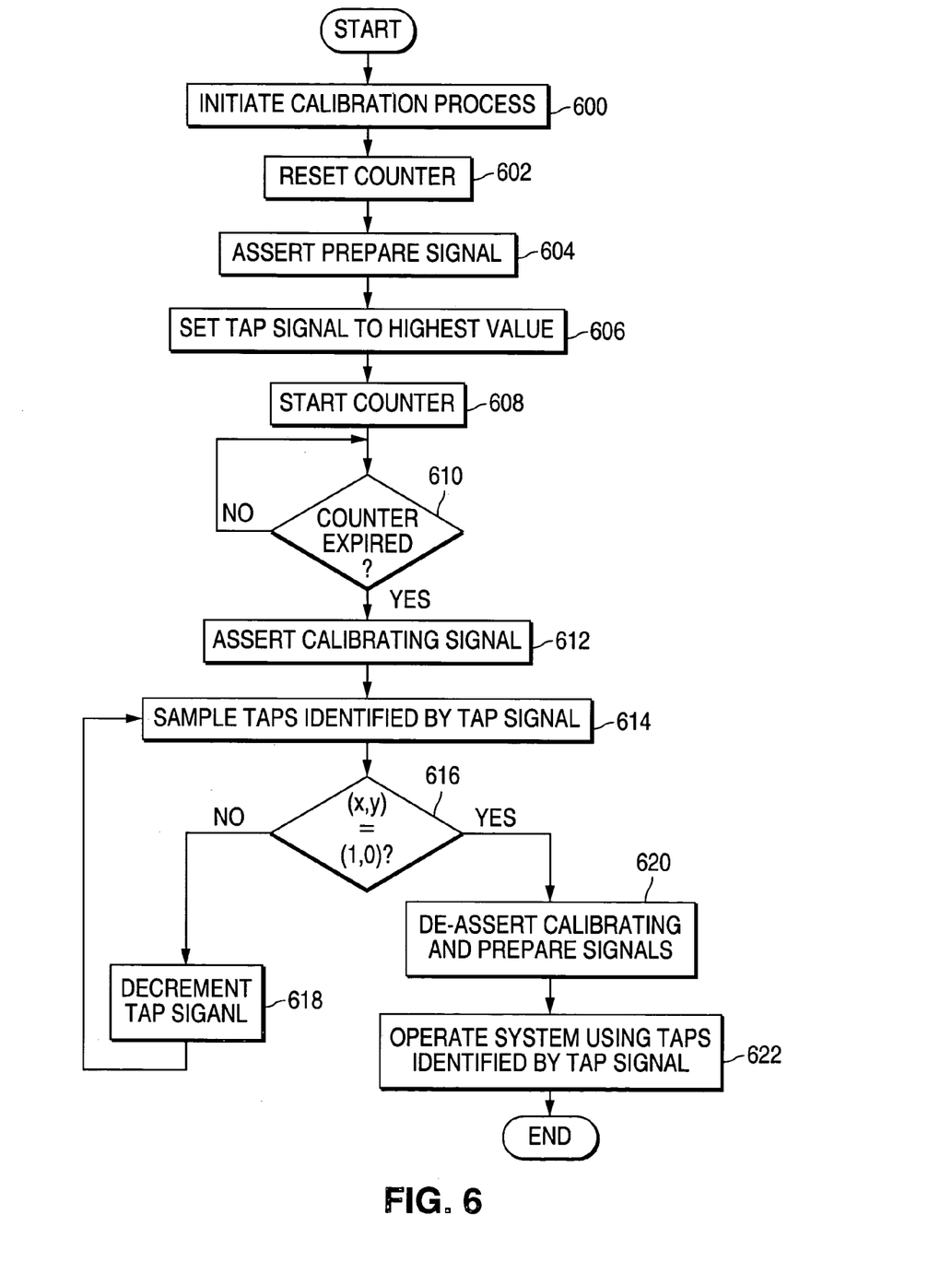
FIG. 6 is a flow diagram illustrating a method for providing self-calibration for adaptively adjusting the power supply voltage for the digital processing system of FIG. 1 in accordance with one embodiment of the present invention.

FIG. 6 is a flow diagram illustrating a method for providing self-calibration for adaptively adjusting the power supply voltage 102 for the digital processing system 100 in accordance with one embodiment of the present invention. The method begins at step 600 where the calibration process is initiated. The calibration process may be initiated by the calibrator 118 receiving an asserted reset signal 204 or an asserted start signal 410 or by any other suitable means.

At step 602, the calibrator 118 resets a counter for use in allowing the system to stabilize. At step 604, the calibrator 118 asserts the prepare signal 412. According to the embodiment illustrated in FIG. 4, the prepare signal 412 closes the switch 404, resulting in the nominal power supply voltage 424 being provided to the power supply 114 as the reference voltage 422.

At step 606, the calibrator 118 sets the tap signal 416 to its highest value. Returning to the embodiment of FIG. 4, the tap signal 416 is set to 1111, or 15. At step 608, the calibrator 118 starts the counter.

At decisional step 610, the calibrator 118 makes a determination regarding whether or not the counter has expired.

According to one embodiment, the counter may expire after approximately 1.0 milliseconds; however, it will be understood that the counter may expire after any suitable amount of time has passed that allows the nominal power supply voltage 424 to propagate through the system 100. If the counter has not yet expired, the method follows the No branch and remains at decisional step 610 until the counter expires. If the counter has expired, the method follows the Yes branch from decisional step 610 to step 612.

At step 612, the calibrator 118 asserts the calibrating signal 414 to notify the system 100 that the calibration process is in progress. At step 614, the calibrator 118 samples the taps identified by the tap signal 416 by inspecting the multiplexer outputs 418 and 420. Thus, for example, while the tap signal 416 is 1111, the multiplexer outputs (x, y) 418 and 420 correspond to the tap-14 signal 324 and a logic low, or (tap-14, 0). If the tap-14 signal 324 comprises a logic high, the result is (1, 0), while if the tap-14 signal 324 comprises a logic low, the result is (0, 0).

At decisional step 616, the calibrator 118 makes a determination regarding whether or not the result from step 614 is (1, 0), meaning that the correct first and second delay cells 200 have been identified. If the result is not (1, 0), the method follows the No branch from decisional step 616 to step 618. At step 618, the calibrator 118 decrements the tap signal 416, after which the method returns to step 614 where the calibrator 118 samples the new taps identified by the decremented tap signal 416.

Returning to decisional step 616, if the result is (1, 0), the method follows the Yes branch from decisional step 616 to step 620. At step 620, the calibrator 118 de-asserts the calibrating signal 414 and the prepare signal 412. At step 622, the digital processing system 100 operates normally using the taps identified by the tap signal 416 to identify the first and second delay cells 200 to be used by the slack time detector 112 in determining whether or not to adjust the power supply voltage 126 for proper system operation, after which the method comes to an end.

Although the present invention has been described with several embodiments, various changes and modifications may be suggested to one skilled in the art. It is intended that the present invention encompass such changes and modifications as fall within the scope of the appended claims.

What is claimed is:

1. A method for providing self-calibration for adaptively adjusting a power supply voltage in a digital processing system, comprising:

providing a nominal power supply voltage to the system as a power supply voltage;

propagating a regulator clock signal through a delay line, the delay line comprising a plurality of delay cells and operable to function based on the nominal power supply voltage;

sampling a plurality of pairs of delay cells until a first and second delay cell are identified based on the first delay cell receiving the regulator clock signal and the second delay cell failing to receive the regulator clock signal at a specified time;

providing a reference voltage to the system as the power supply voltage; and operating the system using the first and second delay cells to determine whether to adjust the power supply voltage for the system.

2. The method of claim 1, operating the system comprising:

receiving the power supply voltage;

receiving the regulator clock signal;

propagating the regulator clock signal through the delay line;

examining an output of the first delay cell and an output of the second delay cell;

determining whether to request more power based on the outputs of the first and second delay cells; and sending a power control signal to request more power when a determination is made to request more power based on the outputs of the first and second delay cells.

3. The method of claim 2, operating the system further comprising:

determining whether to request less power based on the outputs of the first and second delay cells when a determination is made not to request more power based on the outputs of the first and second delay cells; and sending a power control signal to request less power when a determination is made to request less power based on the outputs of the first and second delay cells.

4. The method of claim 1, further comprising generating a steady signal based an output of the first delay cell.

5. The method of claim 1, further comprising receiving a calibration initiation signal.

6. The method of claim 5, the calibration initiation signal comprising one of a reset signal and a start signal.

7. A method for providing self-calibration for adaptively adjusting a power supply voltage in a digital processing system, comprising:

setting a tap signal to a highest value;

propagating a regulator clock signal through a delay line, the delay line comprising a plurality of delay cells;

sampling a first pair of taps in the delay line, each tap corresponding to one of the delay cells;

determining whether the first pair of taps corresponds to a first and second delay cell, the first and second delay cells identified based on the first delay cell receiving the regulator clock signal and the second delay cell failing to receive the regulator clock signal at a specified time;

concluding the calibration when a determination is made that the first pair of taps corresponds to the first and second delay cells; and operating the system using the first and second delay cells to determine whether to adjust a power supply voltage for the system.

8. The method of claim 7, further comprising:

decrementing the tap signal when a determination is made that the first pair of taps fails to correspond to the first and second delay cells;

sampling a subsequent pair of taps in the delay line, the subsequent pair of taps corresponding to the decremented tap signal;

determining whether the subsequent pair of taps corresponds to the first and second delay cells; and concluding the calibration when a determination is made that the subsequent pair of taps corresponds to the first and second delay cells.

9. The method of claim 8, further comprising decrementing the tap signal when a determination is made that the subsequent pair of taps fails to correspond to the first and second delay cells and sampling a subsequent pair of taps in the delay line, the subsequent pair of taps corresponding to the decremented tap signal, until a determination is made that the subsequent pair of taps corresponds to the first and second delay cells.

10. The method of claim 7, further comprising initiating a self-calibration process.

11. The method of claim 10, initiating a self-calibration process comprising initiating the self-calibration process based on receiving one of a reset signal and a start signal.

12. The method of claim 7, further comprising:

asserting a prepare signal;

monitoring a counter to determine whether a specified amount of time has passed; and asserting a calibrating signal when the specified amount of time has passed.

13. The method of claim 12, the prepare signal operable to provide a nominal power supply voltage to the system as a power supply voltage until the first and second delay cells are identified.

14. A system for providing self-calibration for adaptively adjusting a power supply voltage in a digital processing system, comprising:

a power supply operable to generate a power supply voltage for the system;

a slack time detector coupled to the power supply, the slack time detector operable to generate a plurality of detector outputs;

a multiplexer coupled to the power supply and the slack time detector, the multiplexer operable to receive the detector outputs and to generate a power control signal based on the detector outputs; and a calibrator coupled to the power supply and the multiplexer, the calibrator operable to identify a subset of the detector outputs to be selected by the multiplexer as the power control signal, the power supply operable to generate the power supply voltage based on the power control signal.

15. The system of claim 14, the slack time detector operable to receive a regulator clock signal and the power supply voltage and to generate the detector outputs based on the regulator clock signal and the power supply voltage.

16. The system of claim 14, the calibrator operable to receive the power control signal from the multiplexer and to generate a nominal voltage signal and a tap signal based on the power control signal.

17. The system of claim 16, the power supply operable to generate the power supply voltage based on the power control signal and the nominal voltage signal.

18. The system of claim 14, the power supply comprising a battery.

19. The system of claim 14, the slack time detector comprising a delay line, the delay line comprising a plurality of delay cells, each delay cell comprising a corresponding dynamic level shifter and flip-flop.

20. The system of claim 14, the multiplexer comprising a first multiplexer and a second multiplexer.

* * * * *

UNITED STATES PATENT AND TRADEMARK OFFICE
CERTIFICATE OF CORRECTION

| | | |
|---|---|---|
| PATENT NO. | : 7,024,568 B2 | Page 1 of 1 |
| APPLICATION NO. | : 10/236482 | |
| DATED | : April 4, 2006 | |
| INVENTOR(S) | : Dragan Maksimovic and Sandeep Dhar | |

It is certified that error appears in the above-identified patent and that said Letters Patent is hereby corrected as shown below:

Column 7, line 32, delete "22" and replace with -- 222 --;

Column 9, line 28, delete "n h" and replace with -- $n^{th}$ --.

Signed and Sealed this

Twenty-eighth Day of November, 2006

JON W. DUDAS
*Director of the United States Patent and Trademark Office*